United States Patent [19]

Grotz et al.

[11] Patent Number: 4,959,079
[45] Date of Patent: Sep. 25, 1990

[54] STEAM REFORMING PROCESS WITH LOW FIRED DUTY

[75] Inventors: Bernard J. Grotz, Pasadena; Vito Frankini, Arcadia, both of Calif.

[73] Assignee: Santa Fe Braun Inc., Alhambra, Calif.

[21] Appl. No.: 351,313

[22] Filed: May 9, 1989

Related U.S. Application Data

[63] Continuation of Ser. No. 112,722, Oct. 23, 1987, abandoned.

[51] Int. Cl.$^5$ .............................................. C01B 3/34
[52] U.S. Cl. .................... 48/198.7; 252/373; 423/652
[58] Field of Search ............ 48/196 A, 214 A, 94, 48/198.7; 423/652, 653, 654; 422/204, 196, 197, 202, 312; 252/373

[56] References Cited

U.S. PATENT DOCUMENTS

| | | | |
|---|---|---|---|
| 2,625,470 | 1/1953 | Roberts | 423/652 |
| 3,094,391 | 6/1963 | Mader | 48/196 A |
| 3,172,739 | 3/1965 | Koniewiez | 48/196 A |
| 3,215,502 | 11/1965 | Korwin | 422/204 |
| 3,475,135 | 10/1969 | Gargominy | 48/94 |
| 3,607,125 | 9/1971 | Kydd | 48/94 |
| 4,071,330 | 1/1978 | Sederquist | 48/94 |
| 4,098,588 | 7/1978 | Buswell et al. | 48/94 |
| 4,324,649 | 4/1982 | Parizot et al. | 422/197 |
| 4,504,447 | 3/1985 | Spurrier et al. | 422/204 |

FOREIGN PATENT DOCUMENTS

| | | |
|---|---|---|
| 0047359 | 5/1981 | European Pat. Off. . |
| 1767598 | 5/1968 | Fed. Rep. of Germany . |
| 49-4159 | 1/1974 | Japan .................. 423/652 |
| 61-291403 | 12/1986 | Japan . |
| 2050413 | 5/1980 | United Kingdom . |

OTHER PUBLICATIONS

R. A. Sederquist, "Evolution of Steam Reformers . . . ", paper presented at Symposium on Reformers and Hydrogen Plants; Mar. 7-9, 1978.

O. L. Olesen, "Integration of the UTC Reformer . . . ", paper presented at Symposium on Reformers and Hydrogen Plants; Mar. 7-9, 1978.

Brochure, Haldor Topsoe/EPRI, "Heat Exchange Reforming Technology".

Petro-Chem drawing, "Iso-Flow Furnace"; undated.

Petro-Chem brochure, "Iso-Flow Furnaces"; undated.

*Primary Examiner*—Peter Kratz
*Attorney, Agent, or Firm*—Lyon & Lyon

[57] ABSTRACT

A reformer method for reforming hydrocarbons are described. The feed stream is heated in the presence of reforming catalyst both in a tube convection portion and a radiant section of the reformer furnace. The catalyst tubes may have an extended surface in the tube convection portion to enhance heat transfer within the convection portion.

9 Claims, 3 Drawing Sheets

STEAM REFORMING PROCESS WITH LOW FIRED DUTY

This is a continuation of co-pending application(s) Ser. No. 112,722 filed on Oct. 23, 1987 now abandoned.

BACKGROUND OF THE INVENTION

The present invention relates in general to the tubes used in hydrocarbon reforming processes and particularly to processes wherein a hydrocarbon is reformed to obtain hydrogen.

The production of hydrogen from natural gas and other hydrocarbons is well known in the art. Generally, natural gas, such as methane, or other hydrocarbons, and water in the form of steam, are combined in a series of chemical reactions to produce hydrogen in a catalyst-filled tube. The following two chemical reactions are the principal reactions involved in the process:

Reforming Reaction

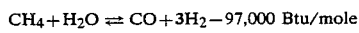

Shift Reaction

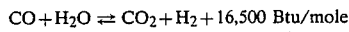

The field of the present invention relates to the heating surface of catalyst tubes in steam reforming heaters commonly used in ammonia and hydrogen plants to produce hydrogen. The preferred embodiment of this invention comprises integral radiant-convection reformer tubes.

DESCRIPTION OF PRIOR ART

The endothermic reforming reaction takes place by reacting some portion of hydrocarbon feed with steam to produce hydrogen and carbon monoxide in catalyst-filled tubes in steam reforming furnaces. Previously, all of the required heat imparted to the steam reformer tubes took place in the radiant section of the furnace where the entire tube was exposed to radiant heat from the burner flame.

The total fired heat liberation is proportional to the amount of radiant heat required. Typically less than half of the heat released is imparted to the catalyst-filled tube by thermal radiation. The balance of the heat is carried by the flue gases leaving the radiant section and is recovered in various coils located in the convection section where flue gas flows transverse to the horizontal tubes that make up the convection coils of the steam reforming furnace. The various convection coils used to recover heat from the flue gases include: the combined hydrocarbon feed plus steam preheat coil, other process preheat coils, boiler feedwater coil, fuel preheat coil, combustion air preheat coil, and the superheated steam coil. The alternative to using the above coils for cooling the convection flue gases is to pass the hot flue gases directly to the atmosphere, thereby losing the energy contained in the hot flue gas.

To reduce the heat load in the radiant section, the combined hydrocarbon feed plus steam is typically preheated to very high temperatures in the convection coils before passing to the radiant section of the furnace, thereby requiring construction from expensive alloy material for the combined hydrocarbon feed plus steam preheat coil and crossover piping interconnecting with the catalyst-filled tubes.

For primary reformers using high temperature gas turbine exhaust for combustion air, combustion air preheaters cannot be used to recover heat from the convection flue gases. Instead, coils for boiler feedwater preheating, steam generation, and steam superheating are the only viable means of recovering maximum heat from flue gases. This heat recovery may require either using steam drivers in the plant for equipment which could otherwise be operated at lower capital cost with electric motors or exporting excess steam production to unfavorable local markets.

FIG. 1 illustrates a conventional reformer with a furnace 10 having burners 12 located therein. Tube 40 is filled with catalyst 45 and runs the height of the furnace 10. A process fluid mixture enters through process inlet 5 and is preheated by flue gas 92 within a convection section 20 before being injected into tube 40. The fluid mixture travels through the catalyst-filled tube 40 and exits to a manifold 80 and process outlet 85. The fluid mixture within tube 40 is heated almost completely by radiant heat transfer within furnace 10. The flue gas 92 exiting through stack convection section 20 is at a very high temperature. Some of the heat value within flue gas 92 is recovered by pre-heating the fluid mixture in exchanger tube 70 in stack convection section 20. Other heat is recovered by making steam by running fluid through exchanger tubes 90 also positioned in stack convection section 20.

SUMMARY OF THE INVENTION

An object of this invention is to reduce the fired duty and consequently the heat load of the convection flue gases to suit overall plant requirements. This invention may also increase the heat absorbed in the catalyst tubes as a percentage of the total heat fired in the furnace. The reduced fired duty and increased heat absorption also allow the hydrocarbon feed plus steam preheat temperature to be reduced, which permits more economical alloys to be used for the preheater exchanger. Further, this amount of reduction may be varied to allow balancing the steam production to the plant consumption.

Toward the fulfillment of these and other objectives, the reforming furnace tubes of the present invention allow additional heat to be imparted to the catalyst tubes by convection from the heat bearing flue gases leaving the radiant section. Thus by extracting more heat from the flue gases leaving the reforming section, the reforming section efficiency is increased and the fired liberation is reduced. In addition the heat input to other services in the stack convection section is reduced.

DETAILED DESCRIPTION OF THE PREFERRED EMBODIMENTS

Figure 2:
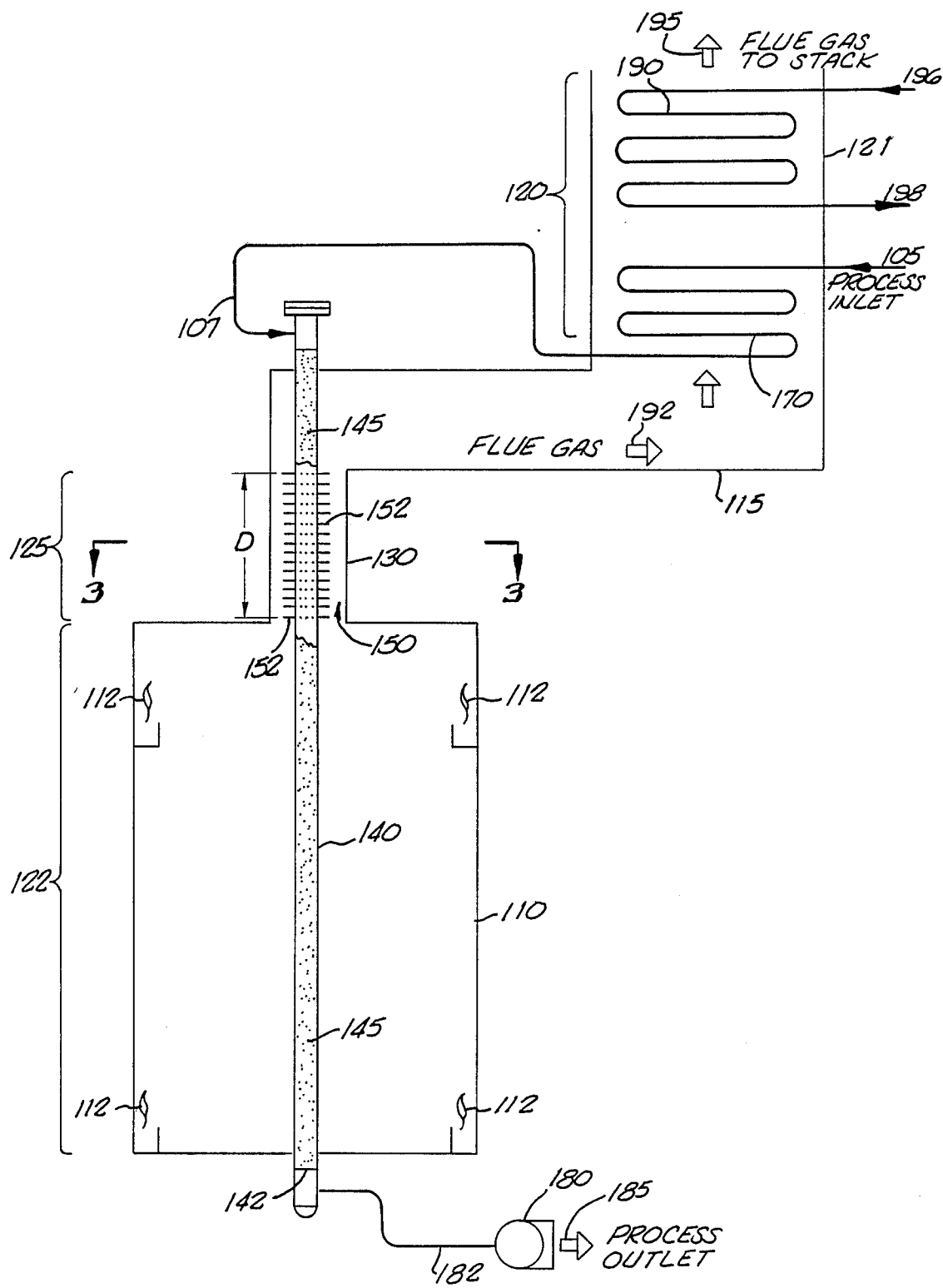
FIG. 2 schematically illustrates a reformer furnace according to the present invention having a tube convection portion.

The preferred embodiments will now be described with reference to the drawings. FIG. 2 illustrates a reformer furnace 110 having a radiant section 122 and a tube convection portion 125.

Figure 1:
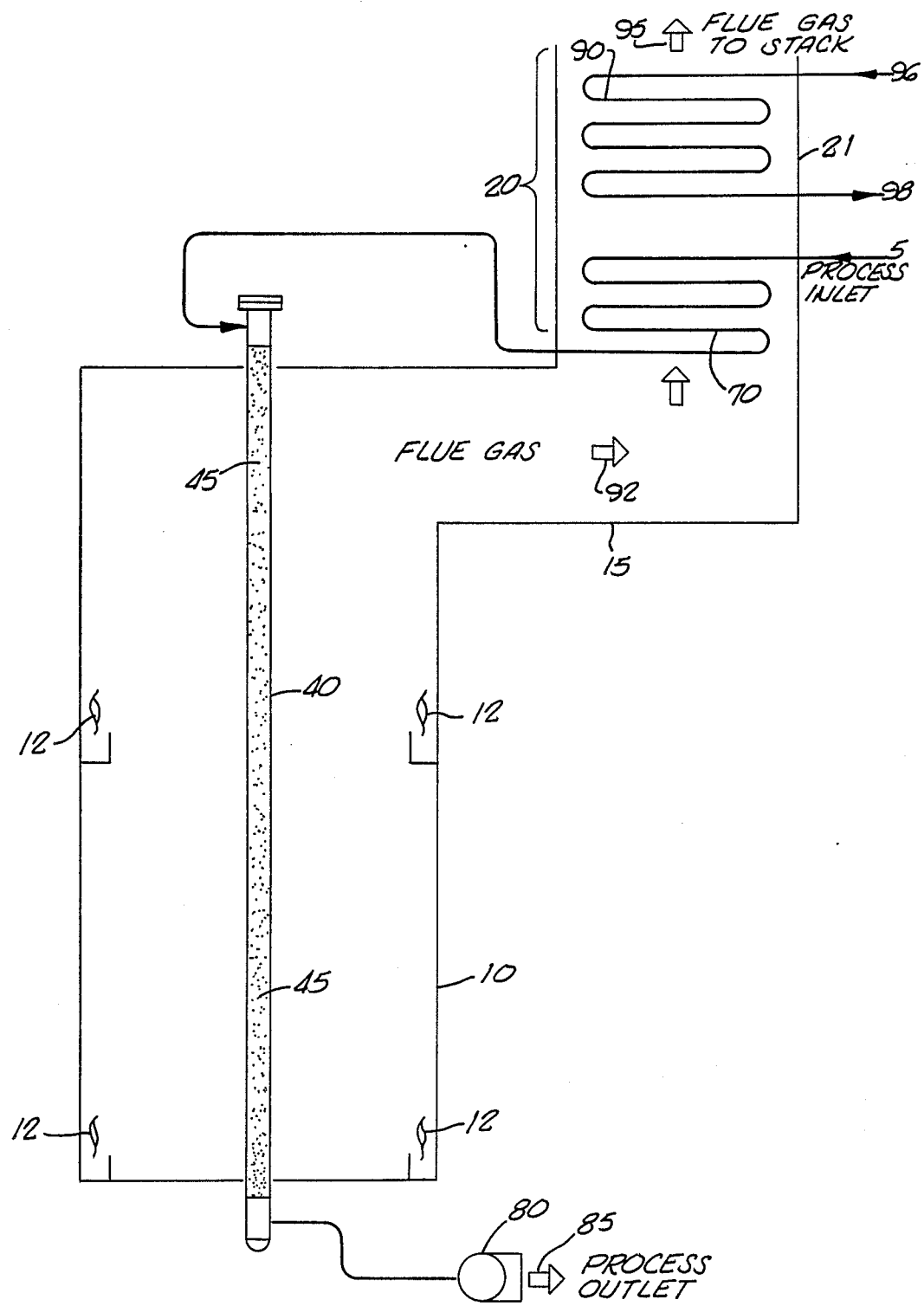
FIG. 1 schematically illustrates a reformer furnace of the prior art.

The integral radiant-convection reformer tubes of the present invention are vertical catalyst tubes 140 with top inlet 107 and bottom outlet 182. The bottom of tube 140 which is in the radiant section 122 is substantially bare and located adjacent the burners 112. The top of the tube 140 contains the extended outer surface 150, and is located between two parallel walls 130, extending from the top of the radiant section 122. A series of vertical catalyst-filled tubes are arranged in a straight line and since FIG. 1 illustrates a side view of the furnace, only one tube 140 is shown. Within the radiant section 122 are the burners 112, which supply the heat input for the furnace 110. The radiant heat from burners 112 impacts upon the bare walls of catalyst tubes 140. Tube 140 is filled with catalyst 145 which is supported in the tube on a catalyst support plate 142.

The tube convection portion 125 of the reformer furnace 110 has a reduced width through which exiting flue gas 192 must pass out of furnace 110. The tube convection portion 125 has two parallel walls 130, 130 which are much closer to the tube 140 than the walls of the radiant section 122. As such, the velocity of flue gas exiting through the tube convection portion 125 is much higher because of the reduced area through which flue gas 192 must travel, thereby increasing the convection heat transfer from the flue gas 192 to the fluid in the catalyst-filled tube 140.

The tubes 140 may have an extended surface 150 in the tube convection portion 125 to further enhance heat transfer. Over a length "D" between the parallel walls 130, the extended surface 150 may be comprised of a series or a plurality of studs 152 attached to the outer surface of tube 140 and extending radially outward therefrom.

Combustion gases from the radiant section 122 pass between the parallel walls 130, which contain the extended surface portion 150 of the catalyst-filled tubes 140. Convection heat from the flue gas 192 is efficiently imparted to the tubes 140 via the extended surface 150. Some additional heat is also transferred to the tubes 140 by radiation from the flue gas 192 and radiation from the parallel walls 130. After passing through the catalyst-tube convection section 125, the flue gas 192 goes to a conventional horizontal tube convection section 120 (which may include preheater exchanger tubes 170 and recovery exchanger tubes 190 for example) and up stack 121 as shown in FIG. 2.

The basic process has a fluid mixture entering the furnace 110 at a process inlet 105 and passing through a series of heat exchanger tubes 170 located within stack 120. The fluid mixture is preheated by the flue gas 192 before the mixture enters the catalyst-filled tube 140. As the fluid mixture travels through the catalyst-filled tube 140, it is first heated by convection within the tube convection portion 125 where high velocity combustion gases from the radiant section 122 impact the extended surface 150 on tube 140. The fluid mixture within tube 140 thereby undergo substantial heating in the presence of catalyst even before entering the radiant section 122. Within the radiant section 122, tube 140 has a substantially bare outer wall and the fluid mixture within tube 140 is heated primarily through radiant heat transfer. Once the fluid mixture has passed through the radiant section 122, it leaves the furnace 110 through exit line 182 and enters manifold 180 in which the fluid mixture from all the catalyst-filled tubes 140 is combined and exits through process outlet 185.

Figure 3:
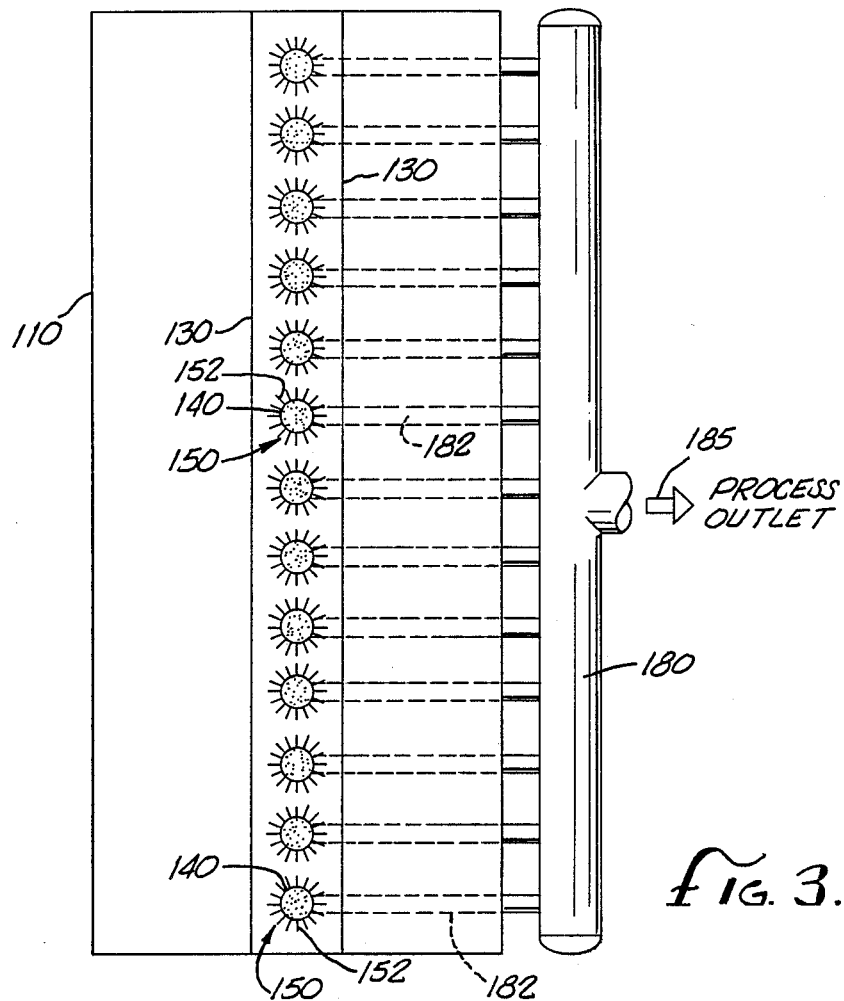
FIG. 3 is a cross sectional view of FIG. 2 taken along the line 3-3.

FIG. 3 is a cross-sectional top view of the furnace 110 of FIG. 2. FIG. 3 illustrates that furnace 110 has many catalyst-filled tubes 140, running the length thereof. Each of the catalyst-filled tubes 140 has an extended surface 150 within the radiant section 122 (see also FIG. 2). A typical reformer furnace may have 150 or more reformer tubes. The catalyst-filled tubes 140 are positioned between the two parallel walls 130, 130. Fluid from tubes 140 exit through exit line 182 into manifold 180, combining and exiting out the process outlet 185.

Figure 4A:
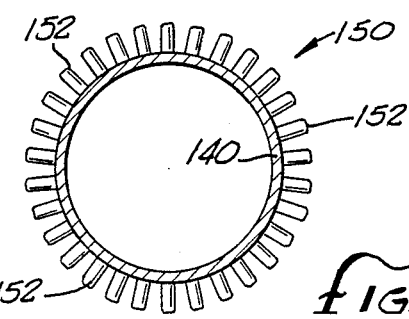
FIGS. 4a and 4b are detailed views of a studded extended surface section of the catalyst-filled tube of FIG. 2.
Figure 4B:
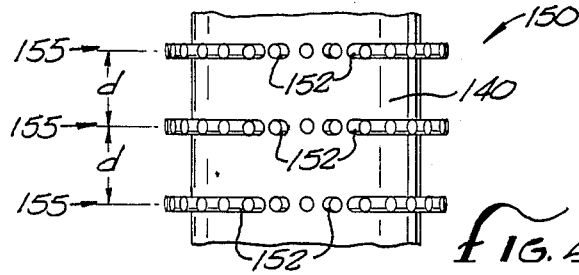

The catalyst-tube convection portion 125 of tube 140 has an extended surface 150. FIGS. 4a and 4b illustrate details of extended surface 150. Extended surface 150 is comprised of a series or plurality of studs 152 attached to the outer surface of the tube 140 and extending radially outward therefrom. The studs 152 are arranged in planes 155 which are spaced a distant of "d" apart. Each plane 155 has approximately 30 studs 152 positioned around the circumference of tube 140.

The combination of stud size, quantity, shape, and spacing of the extended surface section 150 exposed to flue gases leaving the radiant section 122 and their enclosure may be varied to achieve the desired heat absorption characteristic within the catalyst-tube convection portion 125.

Figure 5:
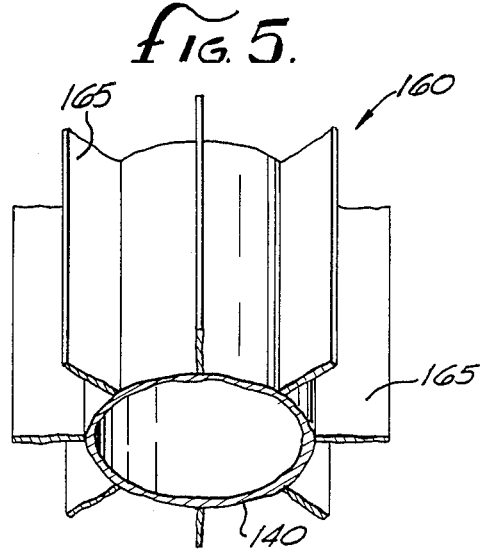
FIG. 5 is a perspective view of an alternative extended surface section of FIG. 4 comprised of fins.

FIG. 5 illustrates an alternative embodiment of extended surface 160 comprised of a plurality of fins 165 longitudinally attached along the outer surface of tube 140 and extending radially outward therefrom. Again the size, orientation, and spacing of fins 165 are chosen to achieve the desired heat absorption characteristics. Though two particular designs for the extended surface 150 have been described, other designs may be selected by those skilled in the art to achieve the desired heat transfer characteristics, given the description and disclosure set forth herein.

The catalyst-tube convection portion 125 may also include baffles (not shown) to enhance convection heat transfer to tube 140.

Though FIGS. 2 and 3 have been described to have a substantially vertically oriented tube 140, other orientations may be employed. FIGS. 2 and 3 illustrates the inlet to the tube 140 on the top of furnace 110, alternatively the inlet to the catalyst tube may be at the bottom and the outlet at the top. In such a case, it would be more suitable to have the radiant portion of the tube at the top and convection portion of the tube at the bottom. In some cases, it may be desirable to have the inlet at the top, outlet at the bottom, and the convection portion at the bottom. A feature of the invention is the combination of a radiant section and a convection portion in a single catalyst tube.

The temperature of the flue gases leaving the catalyst tube portion of this invention can be reduced to approximately 1200° to 1500° F. versus 1700° to 1900° F. in current state-of-the-art furnaces, without substantially increasing the catalyst volume or bare tube surface. As a result, the quantity of fuel required per unit of production may be reduced by up to approximately 25 percent.

The overall cost of the reforming furnace using integral radiant-convection catalyst-filled tubes can be significantly less than for those that do not employ this invention. Lower material cost is achieved by the lower flue gas temperature. Typically the preheat exchanger tubes (such as tubes 70 in FIG. 1) are exposed to flue gas at a temperature of 1700° to 1900° F. Such a temperature requires more expensive alloy tube construction as compared to tubes (such as tubes 170 in FIG. 2) of the present invention which are exposed to a lower temperature of 1200° to 1500° F.

Examples will now be described comparing the present invention to processes of the prior art. The examples compare processes of reformers for a typical 1500 short tons per day ammonia plant. The examples are summarized in Table 1.

ference of the tube 140. The planes 155 are spaced ½ inch apart "d" for the full 7.27 foot height "D" of the convection section 125. The same results can be obtained with other types of extended surface.

Referring to Table 1, the hydrocarbon plus steam feed is preheated at a rate of 44 MM Btu/hr in exchanger tubes 170. The feed enters the catalyst-filled tubes 140 at 1025° F. The feed is heated in furnace 110 at an absorption rate of 154 MM Btu/hr, some of which occurs in the radiant section 122 and the remainder in the catalyst-tube convection portion 125. Fuel consumption is 230 MM Btu/hr at the burners 112 and 191 MM Btu/hr for the gas turbine (not shown). Total fuel

TABLE 1

| Example | Hydrocarbon Feed Plus Steam Preheat Input Q MMBtu/hr | Furnace Burner Consumption Q MMBtu/hr | Turbine Fuel Consumption Q MMBtu/hr | Total Fuel Consumption Q MMBtu/hr |
|---|---|---|---|---|
| 1 | 44 | 302 | 191 | 493 |
| 2 | 44 | 230 | 191 | 421 |
| 3 | 61 | 274 | 191 | 465 |

| Feed Inlet Temp. to Tube | Flue Gas Exit Temp. From Rad. Section | Temp. Flue Gas entry to Stack | Energy Absorbed Radiant + Convection Q MMBtu/hr | Stack Gas Exit Temp | Other Recovery Coils Q MMBtu/hr |
|---|---|---|---|---|---|
| 1025° F. | 1850° F. | 1850° F. | 154 | 350° F. | 203 |
| 1025° F. | 1850° F. | 1470° F. | 154 | 350° F. | 131 |
| 1150° F. | 1850° F. | 1850° F. | 137 | 350° F. | 179 |

EXAMPLE 1

This example is for a typical 1500 short tons per day ammonia plant according to current technology as in FIG. 1. The reforming furnace contains 152 catalyst-filled tubes of 5.75 inches ID by 39.49 feet high. About 36.5 feet of the catalyst tube height is in the radiant zone. Hydrocarbon plus steam feed enters the process inlet 5 and is preheated in exchanger tubes 70 at a heat input rate of 44 MMBtu/hr. The feed enters the catalyst-filled tubes 40 at a temperature of 1025° F. The feed is then heated in furnace 10 at an absorption rate of 154 MMBtu/hr which is entirely in a radiant section since this example has no convection section. Fuel consumption is 302 MMBtu/hr for the burners 12 and 191 MMBtu/hr. for the gas turbine (not shown) which supplies air for the combustion process. Total fuel consumption is 493 MMBtu/hr. The combustion gases leave the combustion zone and enter the convection section 20 at a temperature of 1850° F. Within convection section 20, the gases preheat the hydrocarbon feed in exchanger tubes 70. Further heat is recovered in exchanger tubes 90 at a rate of 203 MMBtu/hr. The flue gas to the stack then exits at 350° F.

EXAMPLE 2

This example illustrates a 1500 short tons per day ammonia plant according to the present invention as illustrated in FIG. 2. The number and diameter of the catalyst tubes is the same as in Example 1. The length of the tubes is increased to 42.06 feet with 29.94 feet of the tube length in the radiant section 122. Tubes 140 have 7.27 feet of extended surface 150 which comprises the convection section 125 of the catalyst-filled tubes 140. The extended surface 150 (refer to FIGS. 4a & b) is comprised of studs 152 of ⅜ inches diameter by ¾ inches high with 30 studs 152 per plane 155 around the circumconsumption is 421 MM Btu/hr.

The combustion gases exit the radiant section 122 and enter the catalyst-tube convection portion 125 at 1850° F. The flue gas 192 enters convection section 120 at 1470° F. Within convection section 120, the flue gas 192 preheats the hydrocarbon stream in exchanger tubes 170. Further heat is recovered in exchanger tubes 190 at a rate of 131 MM Btu/hr. The flue gas to the stack exits at 350° F.

In this example in which the temperature entering the catalyst tube is 1025° F. (the same as in Example 1), the fuel to the reformer is reduced by about 24 percent. The total fuel to the reformer plus gas turbine is reduced by about 15 percent.

EXAMPLE 3

This example is for a conventional reformer similar to that of Example 1 except that the inlet temperature is raised from 1025° F. to 1150° F. to reduce the overall fired duty. In this case, there are 124 catalyst tubes of 6.0 inches ID by 39 feet high.

Referring to FIG. 1 and Table 1, feed enters inlet 5 and is preheated in exchanger tubes 70 at a heat input rate of 61 MMBtu/hr. The feed enters the catalyst-filled tube 40 at 1150° F. and is then heated in furnace 10 at an absorption rate of 137 MMBtu/hr which is entirely in a radiant section since this example has no catalyst-tube convection portion. Fuel consumption is 274 MMBtu/hr for the burners 12 and 191 for the gas turbine (not shown) for a total fuel consumption of 465 MMBtu/hr.

The combustion gases leave the combustion zone and enter convection section 20 (the flue gas 92) at a temperature of 1850° F. The flue gas 92 preheats the hydrocarbon feed in exchanger tubes 70. Further heat is recovered at a rate of 179 MMBtu/hr in exchanger tubes 90. Flue gas to the stack exits at 350° F.

Comparing the process conditions for the integral radiant-convection catalyst-filled tube of Example 2 with Example 3, the present invention as shown in Example 2 reduces the fuel to the reformer by 16 percent and reduces the total fuel required by 9 percent over Example 3.

In this example, the hydrocarbon feed plus steam temperature entering the catalyst-filled tubes is 125° F. less for the integral radiant-convection catalyst-filled tube of Example 2, thus achieving two objectives simultaneously: (1) a substantially lower cost for the hydrocarbon feed plus steam coil and (2) reducing the fuel firing required for the reforming reaction.

Thus, a furnace and process are disclosed which reform hydrocarbons to obtain a gas containing substantial amounts of hydrogen. While embodiments and applications of this invention have been shown and described, it would be apparent to those skilled in the art that other modifications are possible without departing from the inventive concepts herein. The invention, therefore, it not to be restricted except as in the appended claims.

What is claimed is:

1. A method for the production of hydrogen from a hydrocarbon stream in a steam reforming furnace for a hydrogen or ammonia plant, said furnace having a radiant section and a convection section, the width of the furnace in the convection section being substantially narrower than the width of the radiant section to provide enhanced velocity to the flue gas, the furnace containing a plurality of reforming catalyst-containing single pass tubes, the portion of each of said tubes within said furnace being filled with reforming catalyst, comprising the steps of:
preheating the hydrocarbon stream;
introducing, heating and reacting the hydrocarbon stream and steam in said tubes within said convection section of the furnace wherein a portion of the catalyst-filled tubes have an extended surface integral with or attached to an outer surface of said tubes within the convection section to enhance convection heat transfer to the hydrocarbon stream within the catalyst-filled tube; and thereafter
heating the hydrocarbon stream in said radiant section of the furnace in another portion of said tubes having a substantially bare outer surface within the radiant section thereby causing the hydrocarbon and steam to flow through the tubes in a direction countercurrent to the flow of flue gas through the furnace.

2. A method according to claim 1 wherein said extended surface comprises a plurality of studs attached to an outer surface of said tubes and extending radially outward therefrom.

3. A method according to claim 1 wherein said extended surface comprises a plurality of fins attached along an outer surface of said tubes and extending radially outward therefrom.

4. A method according to claim 1 further comprising creating turbulence in the convection section of said furnace with baffles.

5. A method for the production of hydrogen which comprises (a) reacting a vaporized hydrocarbon with steam in a steam reforming furnace for a hydrogen or ammonia plant, said furnace containing a plurality of steam reforming catalyst-containing single pass vertical tubes each having two sections, the portion of each of said tubes within said furnace being filled with steam reforming catalyst, wherein the step of reacting comprises (1) introducing and heating the hydrocarbon and steam largely by convection in a first section of said tubes filled with steam reforming catalyst, the first section having an extended surface integral with or attached to an outer surface of said tubes, and (2) heating the hydrocarbon and steam in a second steam reforming catalyst filled section of said tubes largely by radiation from a radiant section of the furnace, the second section of said tubes having substantially bare outer walls thereby causing the hydrocarbon and steam to flow through the tubes in a direction countercurrent to the flow of flue gas through the furnace, and (b) enhancing velocity of flue gas along the first section of said tubes by providing a substantially narrowed furnace width.

6. A method according to claim 5 wherein the extended surface comprises a plurality of studs attached to an outer surface of the tubes and extending radially outwardly therefrom.

7. A method according to claim 6 wherein the extended surface comprises a plurality of fins longitudinally attached along an outer surface of said tubes and extending radially outwardly therefrom.

8. A method according to claim 5 wherein the furnace has a top and a bottom portion in which an inlet to the steam reforming catalyst-containing tubes is at the top, an outlet from the steam reforming catalyst-containing tubes is at the bottom, and the flue gas leaves from the top.

9. A method according to claim 5 wherein the furnace has a top and a bottom portion in which an inlet to the steam reforming catalyst-containing tubes is at the bottom, an outer from the steam reforming catalyst-containing tubes is at the top, and the flue gas leaves at the bottom.

* * * * *